United States Patent
Flatley

(10) Patent No.: US 11,104,595 B2
(45) Date of Patent: Aug. 31, 2021

(54) PROCESSING OF AQUEOUS WASTE STREAMS TO REMOVE NAPHTHENIC ACIDS

(71) Applicant: Suncor Energy Inc., Calgary (CA)

(72) Inventor: Martin Flatley, Petrolia (CA)

(73) Assignee: Suncor Energy Inc., Calgary (CA)

(*) Notice: Subject to any disclaimer, the term of this patent is extended or adjusted under 35 U.S.C. 154(b) by 437 days.

(21) Appl. No.: 15/273,896

(22) Filed: Sep. 23, 2016

(65) Prior Publication Data

US 2017/0088447 A1 Mar. 30, 2017

(30) Foreign Application Priority Data

Sep. 30, 2015 (CA) .................................. CA 2906571

(51) Int. Cl.
*C02F 3/02* (2006.01)
*C02F 1/52* (2006.01)
(Continued)

(52) U.S. Cl.
CPC .............. *C02F 3/02* (2013.01); *C02F 1/5236* (2013.01); *C02F 9/00* (2013.01); *C02F 1/288* (2013.01);
(Continued)

(58) Field of Classification Search
CPC .......... C02F 1/288; C02F 1/72; C02F 1/5236; C02F 1/5245; C02F 1/56; C02F 3/006; C02F 3/02; C02F 9/00; C02F 2001/007; C02F 2101/32; C02F 2101/325; C02F 2101/34; C02F 2103/10; C02F 2103/365; C02F 2209/02; C02F 2209/04;
(Continued)

(56) References Cited

U.S. PATENT DOCUMENTS

| | | | |
|---|---|---|---|
| 3,574,329 A | 4/1971 | Beavon | |
| 5,531,898 A * | 7/1996 | Wickham | .................. C02F 3/34 |
| | | | 210/606 |

(Continued)

FOREIGN PATENT DOCUMENTS

| | | |
|---|---|---|
| CA | 2788108 A1 | 8/2011 |
| CA | 2781411 A1 | 12/2012 |

(Continued)

OTHER PUBLICATIONS

Misiti et al. Fate and effect of naphthenic acids on oil refinery activated sludge wastewater treatment systems, Oct. 2012, Water Research vol. 47, pp. 449-460 (Year: 2012).*

(Continued)

*Primary Examiner* — Patrick Orme
(74) *Attorney, Agent, or Firm* — CPST Intellectual Property Inc.; Brett J. Slaney

(57) ABSTRACT

A method is provided for the treatment of waste streams resulting from the processing of hydrocarbons that contain naphthenic acids, for example desalter brine resulting from the extraction or production of hydrocarbons from an oil sands reservoir. Naphthenic acids can be removed from these streams by removing oil-wet solids from the waste stream prior to conventional waste water processing, and the oil-wet solids can further be independently remediated to reduce naphthenic acid concentration for disposal.

38 Claims, 5 Drawing Sheets

(51) Int. Cl.
  C02F 3/00 (2006.01)
  C02F 1/56 (2006.01)
  C02F 9/00 (2006.01)
  C02F 103/36 (2006.01)
  C02F 1/28 (2006.01)
  C02F 1/72 (2006.01)
  C02F 101/32 (2006.01)
  C02F 1/00 (2006.01)
  C02F 101/34 (2006.01)
  C02F 103/10 (2006.01)

(52) U.S. Cl.
  CPC ............ *C02F 1/5245* (2013.01); *C02F 1/56* (2013.01); *C02F 1/72* (2013.01); *C02F 3/006* (2013.01); *C02F 2001/007* (2013.01); *C02F 2101/32* (2013.01); *C02F 2101/325* (2013.01); *C02F 2101/34* (2013.01); *C02F 2103/10* (2013.01); *C02F 2103/365* (2013.01); *C02F 2209/02* (2013.01); *C02F 2209/04* (2013.01); *C02F 2209/06* (2013.01); *C02F 2209/10* (2013.01); *C02F 2209/11* (2013.01); *C02F 2209/44* (2013.01); *Y02W 10/10* (2015.05)

(58) Field of Classification Search
  CPC ............ C02F 2209/06; C02F 2209/10; C02F 2209/11; C02F 2209/44; Y02W 10/10
  See application file for complete search history.

(56) References Cited

U.S. PATENT DOCUMENTS

| | | |
|---|---|---|
| 6,120,678 A | 9/2000 | Stephenson et al. |
| 7,008,536 B2 | 3/2006 | Varadaraj et al. |
| 7,927,479 B2 | 4/2011 | Greaney et al. |
| 8,431,017 B2 | 4/2013 | Varadaraj |
| 8,981,174 B2 | 3/2015 | Wines |
| 2008/0156726 A1* | 7/2008 | Fassbender ............... C02F 1/20 210/613 |
| 2014/0151268 A1 | 6/2014 | Soane et al. |
| 2015/0083648 A1 | 3/2015 | Sams et al. |

FOREIGN PATENT DOCUMENTS

| | | |
|---|---|---|
| CA | 2870244 A1 | 5/2015 |
| CN | 102311201 A | 1/2012 |
| CN | 102442747 A | 5/2012 |
| CN | 103102035 A | 5/2013 |
| CN | 103771652 A | 5/2014 |

OTHER PUBLICATIONS

Quinlan et al. Water treatment technologies for the remediation of naphthenic acids in oil sands process-affected water, Jun. 2015, Chemical Engineering Journal vol. 279, pp. 696-714 (Year: 2015).*

Canadian Office Action issued for Canadian Patent Application No. 2,906,571, dated Mar. 22, 2017.

Allen, E. W., Process water treatment in Canada's oil sands industry: I. Target pollutants and treatment objectives, J. Environ. Eng. Sci., vol. 7, pp. 123-138 (2008).

Misiti, T. et al., Fate and effect of naphthenic acids on oil refinery activated sludge wastewater treatment systems, Water Research, vol. 47, pp. 449-460 (2013).

Quinlan, P. J. et al., Water treatment technologies for the remediation of naphthenic acids in oil sands process-affected water, Chemical Engineering Journal, vol. 279, pp. 696-714 (2015).

* cited by examiner

PROCESSING OF AQUEOUS WASTE STREAMS TO REMOVE NAPHTHENIC ACIDS

CROSS REFERENCE TO RELATED APPLICATION

This is a United States non-provisional patent application claiming priority to, and the benefit of, Canadian Patent Application No. 2,906,571, the entirety of which is incorporated herein by reference.

TECHNICAL FIELD

The following relates to the treatment of aqueous waste streams, particularly waste streams resulting from the processing of hydrocarbons containing naphthenic acids.

BACKGROUND

Naphthenic acids are a mixture of organic carboxylic acids that arise from biodegradation of crude oil deposits by anaerobic bacteria. The naphthenic acid content of a hydrocarbon sample is generally measured indirectly by determining the total acid number (TAN), or acidity of the oil, which is determined by measuring the amount of potassium hydroxide in milligrams that is needed to neutralize adds in one gram of oil.

Hydrocarbon samples having high total acid number (TAN) are associated with a higher naphthenic acid content, with naphthenic acids accounting for a significant portion of the TAN. Naphthenic acids are often grouped or characterized by carbon number and z number (hydrogen deficiency). The molecular weight distribution of naphthenic acids in an oil sample can be used as biomarkers for the source of the oil, with the naphthenic acid characterization varying with the age and method of formation of the deposit.

In general, heavy oil samples are associated with a greater concentration of naphthenic acids. Hydrocarbons that are mined and extracted from an oil sands reservoir, or are produced in situ (i.e., via wells) from an oil sands reservoir, are generally recognized as having a higher naphthenic acid concentration than conventional crudes.

As naphthenic acids are somewhat soluble in water, the processing of heavy oil has been shown to result in waste water and process water having elevated levels of naphthenic acids. Therefore, methods for treating refinery and other hydrocarbon processing waste waters have been developed that typically include an activated sludge or biotreatment step, followed by a chemical treatment and solids removal step prior to discharge of the treated waste water as effluent or recycling as process water.

If high concentrations of naphthenic acids were present in waste water released to the environment, the naphthenic acids could be toxic to fish, producing effects such as distended stomach, dark colour, loss of equilibrium, and mortality. Accordingly, naphthenic acid levels in treated waste water must be kept below levels that may be considered toxic to the environment, and any solids or liquid streams containing significant concentrations of naphthenic acids must be disposed of as hazardous waste.

SUMMARY

A method is provided for treating aqueous waste streams, particularly waste streams resulting from the processing of hydrocarbons containing naphthenic acids. The method provides for the early destabilization of emulsions within the aqueous waste stream, and subsequent physical separation of a solids stream from a waste water stream. The solids stream and waste water stream can be independently treated to efficiently remove naphthenic acids.

In a first aspect, there is provided a method for treating an aqueous waste stream containing naphthenic acids and oil-wet solids, the method comprising:
  pre-treating the aqueous waste stream with one or more additives to promote demulsification, flocculation, coagulation, or agglomeration of the oil-wet solids;
  separating the pre-treated aqueous waste stream into a naphthenic acid-concentrated solids stream and a waste water stream; and
  processing the naphthenic acid-concentrated solids stream to remove naphthenic acids from the solids stream.

In an embodiment, the naphthenic acid-concentrated solids stream comprises an emulsion of oil, water, and oil-wet solids. The aqueous stream can include solids-stabilized emulsion droplets.

The naphthenic acid-concentrated solids stream can have a higher naphthenic acid content than the waste water stream. Further, the naphthenic acid-concentrated solids stream can have a higher naphthenic acid concentration than either the aqueous stream or the waste water stream.

In one embodiment, the step of processing the naphthenic acid-concentrated solids stream comprises a biotreatment step to remove naphthenic acids from the solids stream by microbial digestion. The biotreatment step can include incubation of the naphthenic acid-concentrated solids stream in a bioreactor in the presence of microbes, with a residence time that is at least 7 days, at least 28 days, or any suitable length of time to obtain a target reduction in naphthenic acid concentration.

In one embodiment, the bioreactor is an aeration vessel.

In some embodiments, the bioreactor includes water and microbial nutrients, and the naphthenic acid concentration of the bioreactor can be monitored during incubation. Further, one or more operating conditions of the biotreatment step can be monitored and adjusted to produce a biotreatment effluent having a naphthenic acid concentration that is below a target concentration. The operating condition of the biotreatment step that is adjusted can be temperature, pH, residence time, microbial nutrient concentration, water content, microbial density, or any other adjustable parameter that can impact the biotreatment process, and thereby control the naphthenic acid concentration in the bioreactor or of the biotreatment effluent.

In some embodiments, the biotreated effluent can be a biotreated aqueous stream, and in some implementations the biotreatment effluent can be a biotreated solids stream. In any implementation, the biotreatment effluent can include both solids and liquids. In various implementations, the target naphthenic acid concentration in the biotreatment effluent can be 2 ppm or less, 0.5 ppm or less, 0.1 ppm or less, or any suitable target concentration.

In an embodiment, the one or more additives are selected by testing the aqueous waste stream to determine a suitable additive or combination of additives for separation of the oil-wet solids from the waste water. The method can further include periodically testing the aqueous waste stream to adjust the additive selection or dosage over time to adapt to changes in the aqueous waste stream composition over time during operation. In an embodiment, the testing step includes testing the aqueous waste stream with various additives or combinations of additives using a jar test. The testing can include zeta potential monitoring, turbidity testing, pH testing, or measurement of total suspended solids in the feed.

In an embodiment, the waste water stream or biotreatment effluent is further processed by conventional waste water treatment methods to remove naphthenic acids or other contaminants suspended or dissolved in the waste water or biotreatment effluent prior to reuse, release, or disposal. In some embodiments, the waste water stream or biotreatment effluent is further processed by:
- a biotreatment step comprising incubation with microbes in a bioreactor;
- a clarification step comprising gravity separation;
- a filtration step; and
- a final separation step comprising gravity separation to collect a clarified liquid effluent.

In various embodiments, the clarified liquid effluent can have a naphthenic acid concentration of less than 2 ppm, less than 0.5 ppm, less than 0.1 ppm, or any other suitable target concentration.

In any embodiment, the aqueous waste stream can be a brine stream obtained from a desalter. The desalter can be a desalter used in a hydrocarbon refinery process. In one embodiment, the desalter is used in upgrading bitumen or heavy oil.

In any of the above embodiments, the aqueous waste stream can be a waste stream that results from the processing of high TAN hydrocarbons. The high TAN hydrocarbons can be hydrocarbons produced or extracted from an oil sands reservoir. In one embodiment, the hydrocarbons have been extracted from mined oil sands ore. In one embodiment, the hydrocarbons have been produced from wells in an oil sands reservoir.

In some embodiments, the extracted hydrocarbons have been processed using naphtha as a diluent. In some embodiments, the extracted hydrocarbons have been processed using a paraffinic diluent.

In any of the above embodiments, the one or more additives can be flocculants, coagulants, or pH modifying agents. In one embodiment, the additives are selected from the group consisting of: iron (ferric) chloride, aluminum chloride, sodium hydroxide, an amine polymer, and a polyacrylamide polymer.

In accordance with an embodiment, the naphthenic acid-concentrated solids stream can include at least 80% of the naphthenic acid content of the aqueous waste stream.

In any of the above embodiments, the step of separating the pre-treated aqueous waste stream can include gravity separation of oil-wet solids from the pre-treated aqueous stream. In a specific embodiment, the step of separating can include phase separation in a clarifier vessel or centrifuge.

In a second aspect, there is provided a method for processing desalter brine emulsion containing oil-wet solids, the method comprising:
- pre-treating the desalter brine with one or more additives to promote destabilization of the desalter brine emulsion and agglomeration of the oil-wet solids, the one or more additives comprising iron (ferric) chloride, aluminum chloride, sodium hydroxide, an amine polymer, or a polyacrylamide polymer;
- separating the desalter brine into a solids stream and a waste water stream; and
- processing the combined waste water stream via a conventional water treatment process.

In an embodiment, the desalter brine emulsion comprises naphthenic acids.

The method can further comprise processing the solids stream in a biotreatment step to remove naphthenic acids from the solids stream by microbial digestion. The biotreatment step can involve incubation of the solids stream in a bioreactor in the presence of microbes, with a residence time that is at least 7 days, at least 28 days, or any suitable length of time to obtain a target reduction in naphthenic acid concentration.

In one embodiment, naphthenic acid concentration of the bioreactor contents is monitored during incubation. One or more operating condition of the biotreatment step can be monitored and adjusted to produce a biotreatment effluent having a naphthenic acid concentration that is below a target concentration. In some embodiments, the operating condition that is monitored and adjusted is temperature, pH, residence time, microbial nutrient concentration, water content, or microbial density.

In an embodiment, the one or more additives are selected by testing the desalter brine emulsion to determine a suitable additive or combination of additives for use in destabilization of the desalter brine emulsion. In one embodiment, the step of testing the desalter brine emulsion includes testing with various additives or combinations of additives using a jar test to observe settling of solids.

In an embodiment, the step of testing the desalter brine stream comprises zeta potential monitoring, turbidity testing, pH testing, or measurement of total suspended solids in the feed.

In an embodiment, the method further involves processing the waste water stream using conventional waste water treatment methods to remove naphthenic acids or other contaminants suspended or dissolved in the waste water.

BRIEF DESCRIPTION OF THE DRAWINGS

Various aspects and implementations will now be described by way of example only with reference to the appended drawings wherein.

DETAILED DESCRIPTION

Figure 1:
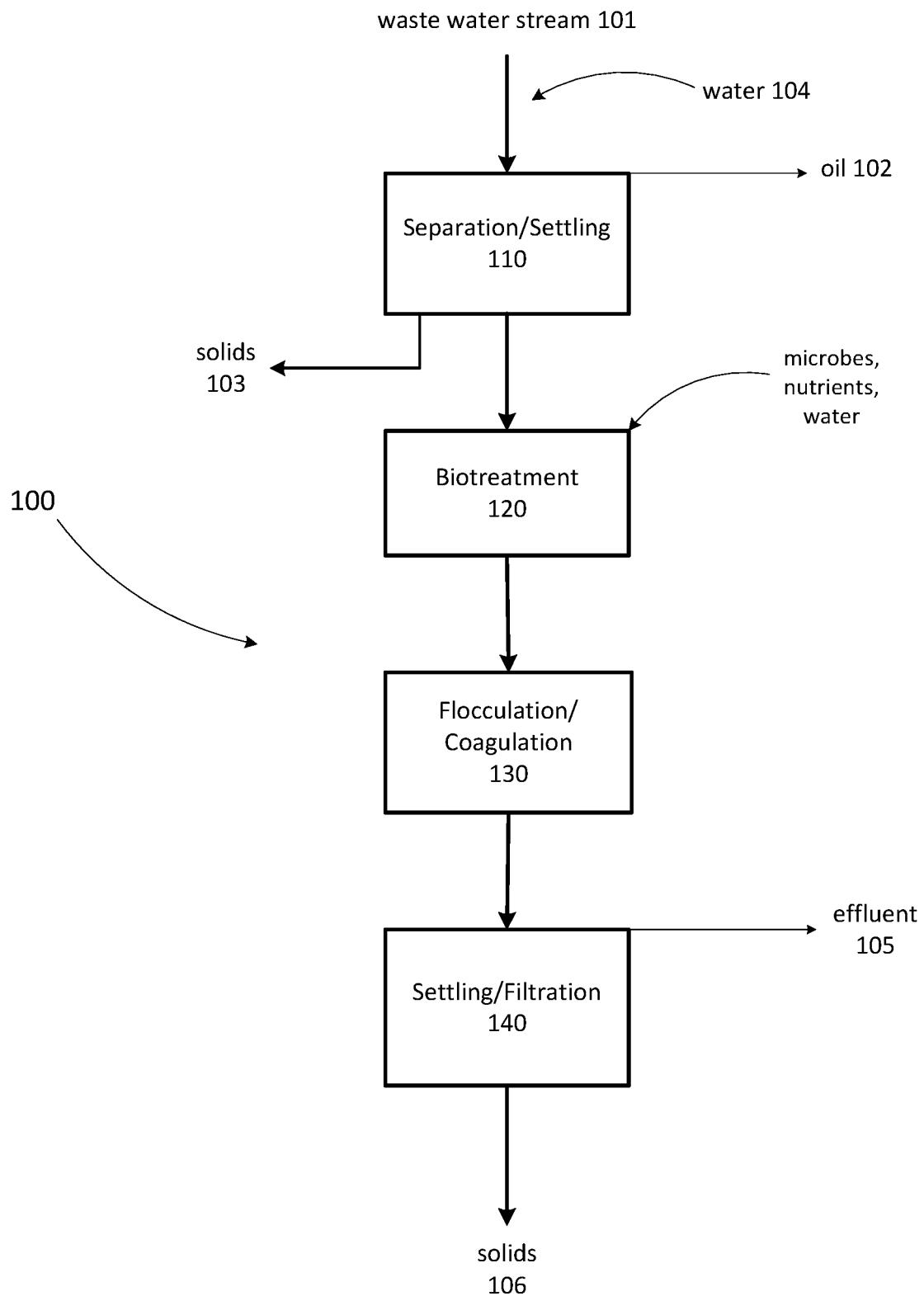
FIG. 1 is a process flow diagram of a conventional refinery waste water treatment process.

A method is provided for the treatment of aqueous waste streams resulting from the processing of hydrocarbons that contain naphthenic acids, for example hydrocarbons extracted or produced from an oil sands reservoir. Naphthenic acids can be removed from these waste streams by removing oil-wet solids from the waste stream prior to conventional waste water processing, and the oil-wet solids can further be independently remediated to reduce naphthenic acid concentration.

More specifically, it has been determined that naphthenic acids remain associated with oil-wet solids that adhere to emulsion droplets carried within the aqueous stream and persist throughout conventional water treatment processes, with naphthenic acids levels persisting in the treated effluent as a result. The presently described process removes the oil-wet solids (and the naphthenic acids associated with the oil-wet solids) upstream of conventional water treatment steps, by pre-treatment with one or more additives to promote demulsification, flocculation, coagulation, or agglomeration of the oil-wet solids. Subsequent phase separation provides a naphthenic acid-concentrated solids stream, and a waste water stream that is reduced in naphthenic acid content. The waste water stream, reduced in naphthenic acid content, can then be processed using conventional water treatment methods to produce an effluent with a naphthenic acid content that is below target levels. Further, the solids stream can be processed independently to remove naphthenic acids, for example by biotreatment under conditions that can be optimized for microbial digestion of naphthenic acids. Using the methods described herein, a target degree of remediation can be independently achieved in both the solids stream and the waste water stream prior to recycling, release, or other disposal.

Naphthenic Acids in Conventional Waste Water Treatment

Given the water-intensive nature of hydrocarbon recovery and processing methods, the focus of waste water treatment has been to obtain an effluent that is sufficient for recycling as process water, or is of acceptable quality for release to the environment. Existing processes for naphthenic acid removal have therefore been directed to the remediation of the water phase. In such processes, waste solids are typically removed late in the water treatment process by physical separation such as in clarifiers or settling ponds.

It has been determined by the present inventor that the primary transport mechanism of naphthenic acid in aqueous streams is by association with oil-wet solids, which persist throughout conventional treatment methods. Specifically, the oil-wet solids, and thereby the naphthenic acids, are carried at the interface of, and serve to stabilize, emulsion droplets. The emulsion may further contain high concentrations of dissolved organic carbon, which negatively impacts the waste water treatment process. Passing the oil-wet solids, naphthenic acids, and dissolved organic carbon through a conventional waste water treatment process, as part of a high volume waste water treatment process, is inefficient. Notably, in conventional waste water treatment processes, early phase separation steps are passive and do not serve to destabilize emulsions. As a result, the emulsion droplets and oil-wet solids (and naphthenic acids) become diluted in the treatment process but are not efficiently removed, allowing naphthenic acids to persist in the waste water treatment effluent.

Analysis of various waste streams resulting from hydrocarbon processing shows that naphthenic acids are highly concentrated in brine streams, and that desalter brine is the major source of naphthenic acids in aqueous refinery waste streams. In hydrocarbon processing, the desalter is used to mix water with crude oil in order to transport salts and contaminants from the oil phase to the water phase, to protect downstream oil processing equipment from corrosion and solid deposition. In operation of the desalter, the mixing of oil with process water creates an emulsion within the desalter, while oil is removed from the top. An emulsion of water, salts, and solids forms within the desalter, and naphthenic acids tend to associate with the emulsion, as the naphthenic acids are slightly polar and become associated with the asphaltene and other hydrocarbons coating the solid particles on the surface of the emulsion. Further, as the pH of the desalter brine increases, the stability of the emulsion increases due to the increased association of the naphthenic acids with other polar molecules such as asphaltenes.

The desalter brine is therefore composed of an emulsion of oil, water, and solids high in naphthenic acid content. With increased pH, the remainder of the naphthenic acid that is not associated with the emulsion partitions into the (polar) water phase. When naphthenic acids persist in the emulsion and also in the water phase throughout conventional water treatment process, conventional water treatment methods cannot keep pace with the rate of waste water production during hydrocarbon processing (as described further below) and are therefore unable to produce a suitably remediated solid and liquid waste stream. As the liquid waste stream can be recycled for use in continued hydrocarbon processing, efforts to remediate the liquid stream have been emphasized, leading to difficulties in disposing of the unremediated solid waste streams.

FIG. 1 provides a diagram of a conventional refinery process 100 for treating waste water. Aqueous waste streams 101 from the refinery, such as desalter brine, are combined and processed together through a Separation or Settling step 110, with oil 102 and solids 103 being recovered, and water 104 added as may be necessary. The Separation or Settling step 110 may include cyclone separation, settling tanks, a dissolved air flotation vessel, and other passive or active separation steps. The effluent from the Separation or Settling step 110 is then subject to a Biotreatment step 120, for example in an aeration basin. In the Biotreatment step 120, the feed is exposed to microbes that naturally metabolize organic matter such as hydrocarbons, and the products of microbial digestion (assuming conditions are appropriate for complete biodegradation) are carbon dioxide and water. However, the residence time for the Biotreatment step 120 of a conventional waste water treatment process is approximately 8 hours due to the large volumes of waste water to be treated. This rate is insufficient to achieve biodegradation of large naphthenic acid compounds in the Biotreatment step 120. Studies have shown that microbial digestion of large naphthenic acid compounds requires at least several days of incubation for suitable decomposition by microbial digestion, as the microbes initially metabolize smaller hydrocarbon compounds before digestion of the larger naphthenic acids. However, despite incomplete bioremediation, the residence time of the Biotreatment step 120 cannot be increased in conventional systems due to the large volumes of aqueous waste water that must be processed. Additional steps are therefore required after biotreatment to further assist in naphthenic acid removal from the waste water.

Following biotreatment, a Flocculation/Coagulation step 130 is present to allow agglomeration and coagulation of remaining solids, and a Settling step 140 provides filtration and/or settling to allow collection of a clarified waste water effluent 105 that may be released to the environment, recycled, or otherwise disposed of. Solids 106 are collected for disposal.

As conventional water treatment methods fail to destabilize emulsion droplets early in the treatment process, oil-wet solids remain associated with the emulsion droplets and are not removed during the early settling phases. This results in naphthenic acid content persisting in the late stages of the conventional water treatment process, as there is insufficient time to provide adequate separation and bioremediation of the oil-wet solids.

Method for Treatment of Aqueous Streams

The presently described process provides for the pre-treatment of specific aqueous streams (such as refinery desalter brine streams) that are likely to be concentrated in oil-wet solids and/or that otherwise contain solids-stabilized emulsions. The pre-treatment step destabilizes the emulsion so that the oil-wet solids can be removed, providing a pre-treated aqueous waste water stream that is significantly reduced in naphthenic acid content. The pre-treated waste water stream can then be combined with other waste water sources and treated by conventional water treatment methods prior to release or recycling, and the oil-wet solids can be independently treated to remove or reduce the naphthenic acid content to an acceptable level for solids disposal.

Figure 2:
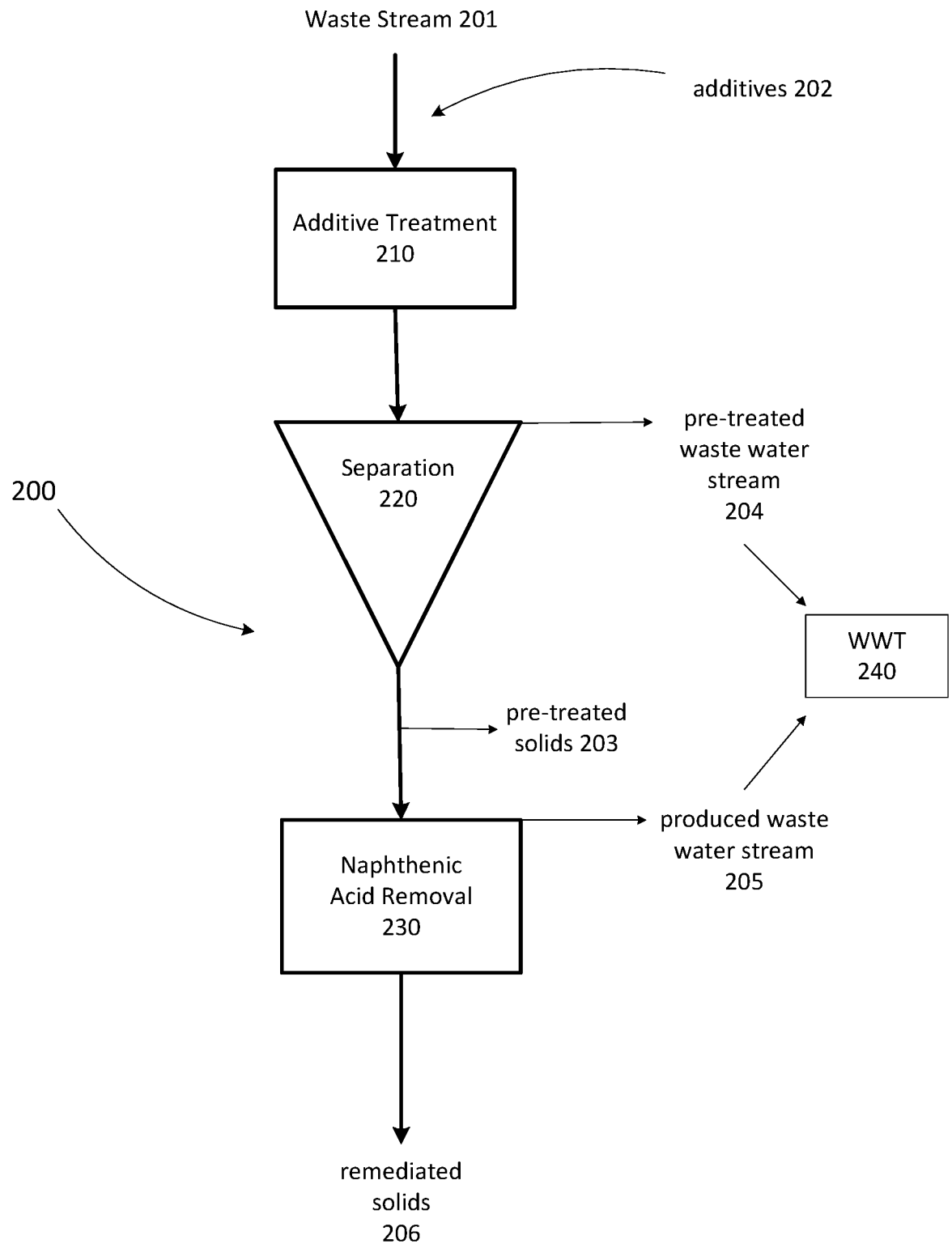
FIG. 2 is a process flow diagram for treatment of an aqueous waste stream.

FIG. 2 depicts a method 200 for treatment of an aqueous stream to remove naphthenic acids and oil-wet solids, in one general implementation. An aqueous waste stream 201, resulting from the processing of heavy (or high TAN) hydrocarbons and containing oil-wet solids and naphthenic acids, is initially mixed with additives 202 in an "additive treatment" step 210 to promote demulsification, agglomeration, coagulation, coalescence, and/or flocculation of solids, particularly oil-wet solids. Disruption of the solids-stabilized emulsion enables the agglomeration and settling of the solids, with associated naphthenic acids. Appropriate additives 202 for demulsification, agglomeration, coagulation, and flocculation will be apparent to those skilled in the art, as will methods and operational conditions for use of same.

In some implementations, the additives can include coagulants such as metal salts, for example ferric chloride and aluminum chloride, can be used to neutralize the negatively charged colloidal particles in the emulsion, based on the zeta potential (charge) of the emulsion, promoting coagulation of solids. Acid and base compounds, as well as amine polymers, can be used to adjust and/or buffer the pH for optimization of emulsion-associated naphthenic acid partitioning to the solids phase. For example, the additives can include suitable acid and base additives such as ferric chloride, aluminum chloride, and sodium hydroxide. Anionic polymeric flocculants such as polyacrylamides can be used to agglomerate the solids particles to aid separation of the oil-wet solids and naphthenic acids from the aqueous stream.

Suitable additives can be selected or combined from the following: multivalent cations such as aluminum, iron, calcium, or magnesium and their salts, such as iron (ferric) chloride and aluminum chloride, acids and bases such as metal chlorides and sodium hydroxide, and polymeric flocculants such as polyacrylamides.

In order to determine suitable additives and suitable dosages of each additive for use with a particular waste water source, samples of the feed stream can be tested with various combinations of additives, for example using the jar test, to determine a suitable combination of additives for solids removal. Further, for continual optimization of the additive dosage based on feed variability, the feed can be sampled periodically or tested continually. Such tests and measurements can include zeta potential monitoring, turbidity testing, pH testing, and measurement of total suspended solids in the feed.

A subsequent "separation" step 220 results in the collection of a pre-treated solids stream 203 and a pre-treated waste water stream 204. The pre-treated waste water stream 204 is reduced in naphthenic acid content and can be combined with other waste water streams and further processed using conventional waste water treatment steps for recycling or release to the environment. In experimental testing, the concentration of naphthenic acids in the pre-treated waste water stream 204 was reduced by up to 90% when compared to starting naphthenic acid concentration in the waste stream 201. Accordingly, pre-treatment with additives and separation to remove the oil-wet solids significantly reduces the naphthenic acid content (pre-treated waste water 204) prior to processing through conventional waste water treatment methods.

The pre-treated solids stream 203 is concentrated in naphthenic acid content and is further treated in a "naphthenic acid removal" step 230, which includes a biotreatment step for microbial digestion of hydrocarbons from the solids stream. The naphthenic acid removal step 230 for the pre-treated solids 203 is not dependent on the method or rate of handling of the pre-treated waste water 204. Accordingly, the naphthenic acid removal step 230 can be handled in a flexible manner based on a desired remediation of the pre-treated solids stream 203. For example, biotreatment of the pre-treated solids 203 can be processed in batches and subject to long term microbial digestion, with each batch processed for several days or weeks to allow complete or substantial naphthenic acid digestion to achieve a desired target naphthenic acid concentration in the solids stream 206, with recovery of produced waste water 205. In some implementations, the naphthenic acid removal step 230 includes a biotreatment step in which microbial digestion occurs for at least 7 days, at least 28 days, or more than 28 days. The disadvantage in conventional systems of having limited residence time, as discussed above, is therefore averted.

The naphthenic acid removal step 230 for solids can include the use of PAC (powdered activated carbon), batch reactors, or membrane bioreactors. Further process steps may include sand filtration, activated carbon treatment, and chemical oxidation.

Waste water 204, 205, recovered from the separation step 220 or naphthenic acid removal step 230, respectively, can be collected and stored for processing through conventional waste water treatment methods 240, to remove naphthenic acids and other contaminants suspended or dissolved in the aqueous phase.

Aqueous streams that can be treated in accordance with the herein-described process can include, for example, desalter brine, spent caustic, sour water, refinery process water (for example water used for steam generation or as cooling water) or any other aqueous stream that is believed to contain oil-wet solids and/or naphthenic acids. Preferably, the aqueous streams result from a heavy hydrocarbon extraction, treatment, upgrading, refining, or other processing methods. The aqueous feed streams can be generated at the same or at separate geographic locations, and two or more such streams may be combined, depending on the process configuration, and treated together.

Figure 3:
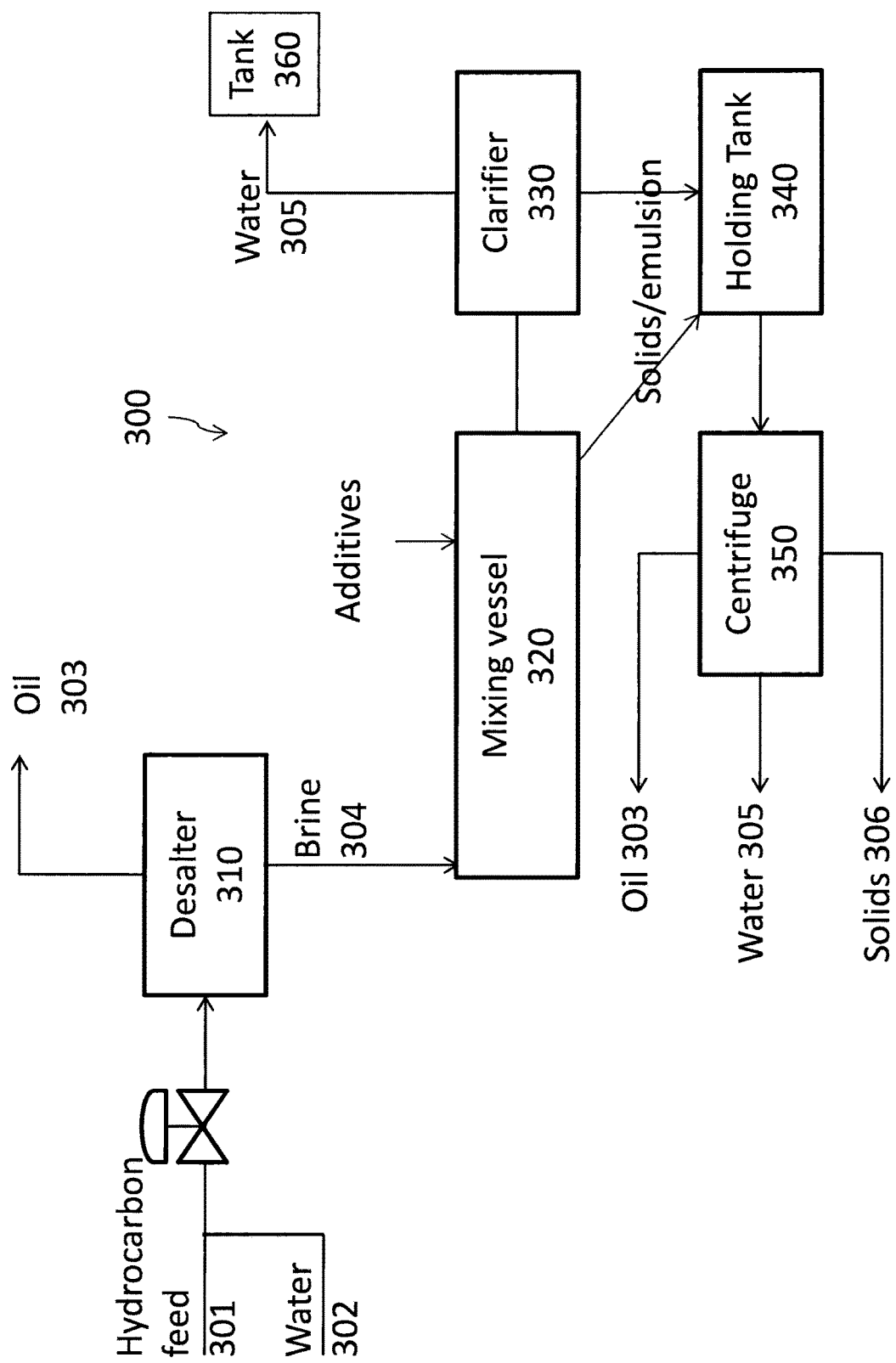
FIG. 3 is a schematic diagram of a process for treating an aqueous waste stream, in one embodiment.

With reference to FIG. 3, a method 300 and process configuration for pre-treatment of desalter brine is shown, in one implementation. A hydrocarbon feed 301 and water 302 are mixed and processed in a desalter 310 to produce a desalted oil feed 303 and desalter brine 304. The desalter brine 304 includes oil-wet solids, naphthenic acids, and other contaminants removed from the hydrocarbon feed 301 by processing in the desalter 310. The desalter brine 304 is then pre-treated by mixing with additives such as coagulants, flocculants, and acid-base regulating chemicals in the additive mixing vessel 320. In one implementation, each additive is mixed into the feed in a separate compartment of the mixing vessel as the feed progresses through each compartment.

Any flocculated solids, emulsified oil, oil-wet solids, or other agglomerated or coagulated solids that form during mixing with the additives are recovered, while the remaining aqueous phase is further separated in a clarifier 330. The solids/emulsion stream (containing oil, water, and solids in various forms) is further separated by a centrifuge 350. A holding tank 340 provides surge capacity to allow batch processing by the centrifuge 350. At each pre-treatment step a clarified water stream 305 is recovered and sent to a waste water holding tank 360, while the solids/emulsion streams recovered from each pre-treatment settling step are collected in holding tank 340 and ultimately processed by the centrifuge 350.

The pre-treatment process results in the recovery of three waste product streams: oil 303, which can be directed to oil processing steps; waste water 305, which can be sent to waste water holding tank 360, and pre-treatment solids 306. The pre-treatment solids can be disposed of directly; however in a preferred embodiment, the pre-treatment solids are further processed to remove naphthenic acids therefrom prior to solids disposal. Waste water holding tank 360 can be used to supply a conventional water treatment process to remove naphthenic acids and other contaminants suspended or dissolved in the aqueous phase prior to release or recycling.

Further Processing of Pre-treated Solids

Figure 4:
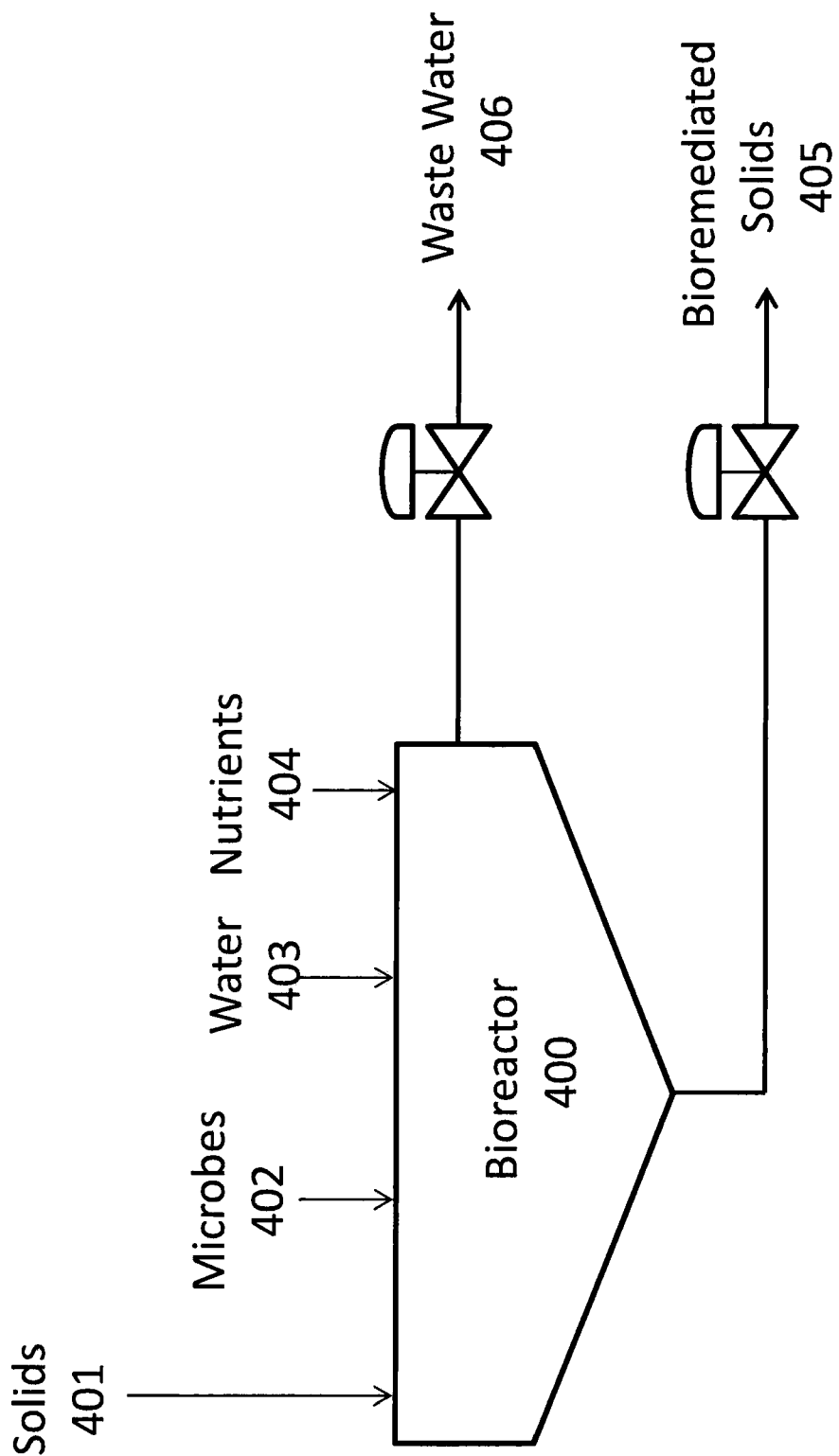
FIG. 4 is a schematic diagram of a process for solids treatment, in one embodiment.

With reference to FIG. 4, a biotreatment step is shown for bioremediation of oil-wet solids. Oil-wet solids 401 (such as solids 306 recovered from desalter brine using the method shown in FIG. 2), can be fed to a bioreactor 400 that is stocked with microbes 402 and supplemented with water 403 and microbial nutrients 404. Appropriate temperature and aeration conditions are provided during biotreatment to facilitate microbial digestion of hydrocarbons. Bioremediated solids 405 and waste water 406 can be produced from the bioreactor continually or in batches, depending on the preferred mode of operation of the bioreactor. The hydrocarbon and/or naphthenic acid content is measured periodically or continually and the bioreactor conditions are modified as needed. Controlled operation of the bioreactor can be based on a preferred rate of bioremediation, a preferred incubation or residence time in the bioreactor, or based on a target naphthenic acid reduction or concentration in the waste water 406 or bioremediated solids stream 405. Various adjustments to the biotreatment conditions may be made to facilitate this control, such as monitoring and adjusting the temperature, pH, residence time, microbial nutrient concentration, water content, or microbial density in the bioreactor.

Monitoring and adjusting the operational conditions of the solids biotreatment step based on any desired endpoint is possible due to the early recovery of solids by pre-treatment of the desalter brine or other aqueous waste water feed stream. In prior systems where solids are not separated from the aqueous stream early in the process, any bioremediation process is driven by the rate of waste water feed to the system, which does not provide sufficient time for controlled bioremediation, particularly when naphthenic acids are associated with oil-wet solids. Independent handling of a pre-treated waste water stream and a pre-treated solids treatment provides flexibility to optimize the clarification and decontamination of each stream as desired.

Figure 5:
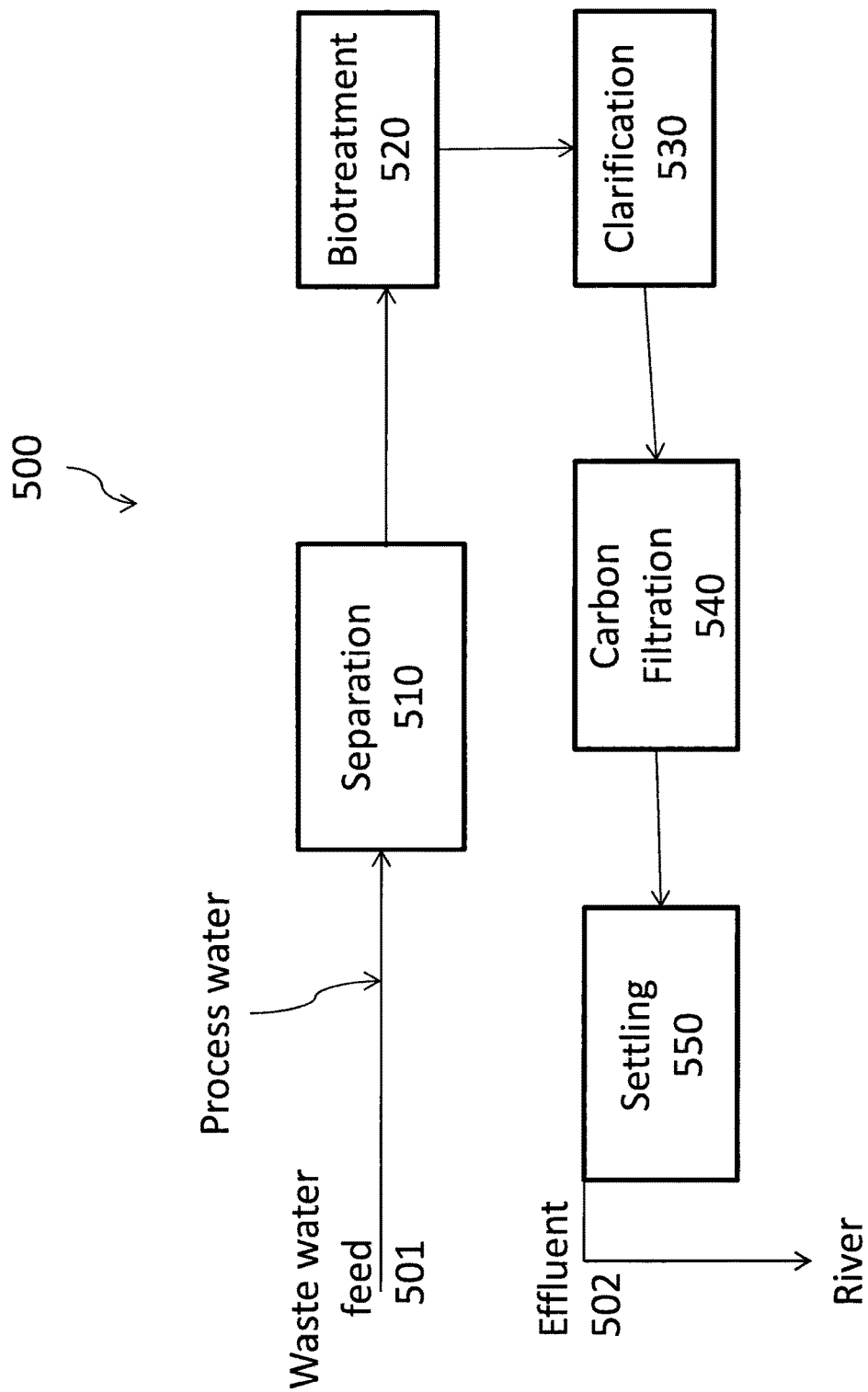
FIG. 5 is a process flow diagram of a treatment process for handling pre-treated waste water.

The pre-treated water stream may be processed using conventional waste water treatment methods. In FIG. 5, a waste water treatment process 500 for handling pre-treated waste water (for example waste water stream 406 from the process shown in FIG. 4, waste water 305 shown in FIG. 3, or waste water 204, 205, from the process shown in FIG. 2) is shown. The waste water feed 501 is first subject to a "separation" step 510. The separation step 510 can include one or more passive or active physical separation methods, such as cyclonic separation, settling in an equalization tank, processing in a dissolved air flotation vessel, or by other suitable separation methods. The resulting water phase (overflow) is processed through a "biotreatment" step 520, which can include one or more aeration basins or bioreactors containing hydrocarbon-digesting microbes, under conditions suitable for microbial digestion of suspended hydrocarbons in the aqueous phase. The biotreatment effluent is clarified by addition of coagulants, flocculants, or other additives, that aid in the settling of suspended particles from the water phase. The effluent from this "clarification" step 530 can be passed through a "carbon filtration" step 540 prior to a final "settling" step 550 that can include retention of the filtrate in a settling pond or vessel. The overflow effluent 502 from the final settling step is of suitable quality for release to the environment or for recycling as process water. Suitable monitoring methods may be incorporated into the waste water treatment process to ensure the water effluent 502 is of suitable quality to meet regulatory standards or other quality or safety specifications. A target naphthenic acid concentration may be desired in order to dispose of the water effluent 502 in a desired manner. For example, naphthenic acid concentration of over 2 ppm in refinery waste water treatment effluent has been associated with acute toxicity in fish when the effluent is released to the environment. Accordingly, based on the proposed means of disposal of the effluent, a target naphthenic acid concentration of less than 2 ppm, less than 1 ppm, less than 0.5 ppm, or a target naphthenic acid concentration of 0.1 ppm may be desired.

Numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. The description is not to be considered as limiting the scope of the examples described herein.

The examples and corresponding figures mentioned herein are provided for illustrative purposes only, and different configurations and terminology can be used without departing from the principles expressed herein. The steps or operations in the flow charts and diagrams described herein are provided for example only. Variations to these steps or operations may be possible without departing from the principles discussed above. In some instances, process steps can be added, deleted, modified, or re-arranged without departing from these principles.

Although the above principles have been described with reference to certain specific examples, various modifications thereof will be apparent to those skilled in the art as outlined in the appended claims.

What is claimed is:

1. A method for treating an aqueous waste stream containing naphthenic acids and oil-wet solids, the method comprising:
    pre-treating the aqueous waste stream obtained from a desalter used in a hydrocarbon refinery process with one or more additives to promote demulsification, flocculation, coagulation, or agglomeration of the oil-wet solids in the aqueous waste stream;
    separating the pre-treated aqueous waste stream into a naphthenic acid-concentrated solids stream and a pre-treated waste water stream; and
    after the step of pre-treating the aqueous waste stream, processing the naphthenic acid-concentrated solids stream independently of processing the pre-treated waste water stream by:
        subjecting the naphthenic acid-concentrated solids stream to a first treatment step to remove naphthenic acids from the solids stream; and subjecting the pre-treated waste water stream to a separate second treatment step to remove naphthenic acids from the aqueous waste stream remaining in the pre-treated waste water stream;

wherein a residence time for the first treatment step is not dependent on limited residence time dictated by the second treatment step.

2. The method as in claim 1, wherein the naphthenic acid-concentrated solids stream comprises an emulsion of oil, water, and oil-wet solids.

3. The method as in claim 1, wherein the naphthenic acid-concentrated solids stream has a higher naphthenic acid content than the pre-treated waste water stream.

4. The method as in claim 1, wherein the aqueous waste stream comprises solids-stabilized emulsion droplets.

5. The method as in claim 1, wherein the first treatment step is a first biotreatment step to remove naphthenic acids from the solids stream by microbial digestion.

6. The method as in claim 5, wherein the first biotreatment step comprises incubation of the naphthenic acid-concentrated solids stream in a bioreactor in the presence of microbes, with the residence time that is at least 7 days.

7. The method as in claim 6, wherein the bioreactor is an aeration vessel.

8. The method as in claim 5, wherein one or more operating conditions of the first biotreatment step is monitored and adjusted to produce a waste water stream having a naphthenic acid concentration that is below a specific concentration.

9. The method as in claim 8, wherein the operating condition of the first biotreatment step that is adjusted is temperature, pH, residence time, microbial nutrient concentration, water content, or microbial density.

10. The method as in claim 8, wherein the specific concentration of naphthenic acid in the biotreatment effluent waste water stream is less than 2 ppm, less than 0.5 ppm, or less than 0.1 ppm.

11. The method as in claim 8, wherein the waste water stream produced from the first biotreatment step is recovered and recirculated as a pre-treated waste water stream to the second treatment step to remove naphthenic acids or other contaminants suspended or dissolved in the waste water and biotreatment effluent prior to reuse, release, or disposal.

12. The method as in claim 11, wherein the second treatment step is a second biotreatment step comprising incubation with microbes in a bioreactor; and both of the pre-treated waste water stream and waste water stream are further processed by:
a clarification step comprising gravity separation;
a filtration step; and
a final separation step comprising gravity separation to collect a clarified liquid effluent.

13. The method as in claim 12, wherein the clarified liquid effluent has a naphthenic acid concentration of less than 2 ppm, less than 0.5 ppm, or less than 0.1 ppm.

14. The method as in claim 1, wherein the one or more additives are selected by testing the aqueous waste stream to determine a suitable additive or combination of additives for separation of the oil-wet solids from the waste water.

15. The method as in claim 14, wherein the step of testing the aqueous waste stream comprises testing with various additives or combinations of additives using a jar test to observe settling of solids.

16. The method as in claim 14, wherein the step of testing the aqueous waste water stream comprises zeta potential monitoring, turbidity testing, pH testing, or measurement of total suspended solids in the feed.

17. The method as in claim 1, further comprising periodically testing the aqueous waste stream to adjust the additive selection or dosage over time to adapt to changes in the aqueous waste stream composition.

18. The method as in claim 1, wherein the desalter is used in a process for upgrading bitumen or heavy oil.

19. The method as in claim 1, wherein the aqueous waste stream results from the processing of high total acid number (TAN) hydrocarbons.

20. The method as in claim 19, wherein the high total acid number (TAN) hydrocarbons have been produced or extracted from an oil sands reservoir.

21. The method as in claim 20, wherein the extracted high total acid number (TAN) hydrocarbons have been processed using naphtha as a diluent.

22. The method as in claim 20, wherein the extracted high total acid number (TAN) hydrocarbons have been processed using a paraffinic diluent.

23. The method as in claim 19, wherein the high total acid number (TAN) hydrocarbons have been extracted from mined oil sands ore.

24. The method as in claim 23, wherein the extracted high total acid number (TAN) hydrocarbons have been processed using naphtha as a diluent.

25. The method as in claim 19, wherein the extracted high total acid number (TAN) hydrocarbons have been processed using a paraffinic diluent.

26. The method as in claim 19, wherein the high total acid number (TAN) hydrocarbons have been produced from wells producing from an oil sands reservoir.

27. The method as in claim 1, wherein the one or more additives are flocculants, coagulants, or pH modifying agents.

28. The method as in claim 1, wherein the one or more additives are selected from the group consisting of: iron (ferric) chloride, aluminum chloride, sodium hydroxide, an amine polymer, and a polyacrylamide polymer.

29. The method as in claim 1, wherein the naphthenic acid-concentrated solids stream comprises at least 80% of the naphthenic acid content of the aqueous waste stream.

30. The method as in claim 1, wherein the step of separating the pre-treated aqueous waste stream comprises gravity separation of oil-wet solids from the pre-treated aqueous stream.

31. The method as in claim 1, wherein the step of separating the pre-treated aqueous waste stream comprises phase separation in a clarifier vessel or centrifuge.

32. The method as in claim 1, wherein the second treatment step is a conventional waste water treatment process.

33. A method for processing desalter brine emulsion containing oil-wet solids, the method comprising:
pre-treating the desalter brine with one or more additives to promote destabilization of the desalter brine emulsion and agglomeration of the oil-wet solids, the one or more additives comprising iron (ferric) chloride, aluminum chloride, sodium hydroxide, an amine polymer, or a polyacrylamide polymer;
separating the desalter brine into a solids stream and a pre-treated waste water stream;
subjecting the solids stream to a first treatment step to remove naphthenic acids from the solids stream; and
independently subjecting the pre-treated waste water stream to a second treatment step to remove naphthenic acids from the aqueous waste stream remaining in the pre-treated waste water stream by:
recovering a waste water stream from the first treatment step;

combining the waste water stream with the pre-treated waste water stream; and processing the combined waste water stream in the second treatment step by applying a conventional waste water treatment process, wherein a residence time for the first treatment step is not dependent on a limited residence time dictated by the second treatment step.

34. The method as in claim 33, wherein the desalter brine emulsion comprises naphthenic acids.

35. The method as in claim 33, wherein the first treatment step is a biotreatment step to remove naphthenic acids from the solids stream by microbial digestion.

36. The method as in claim 35, wherein one or more operating condition of the biotreatment step is monitored and adjusted to produce the waste water stream having a naphthenic acid concentration that is below a specific concentration.

37. The method as in claim 36, wherein the operating condition that is monitored and adjusted is temperature, pH, residence time, microbial nutrient concentration, water content, or microbial density.

38. The method as in claim 33, wherein the second treatment step uses waste water treatment methods to remove naphthenic acids or other contaminants suspended or dissolved in the waste water.

\* \* \* \* \*